US 12,117,877 B2

(12) United States Patent
Zhang et al.

(10) Patent No.: US 12,117,877 B2
(45) Date of Patent: Oct. 15, 2024

(54) LINKAGE DEVICE, APPARATUS ACCESSORY, AND ELECTRONIC APPARATUS

(71) Applicant: BEIJING XIAOMI MOBILE SOFTWARE CO., LTD., Beijing (CN)

(72) Inventors: Hui Zhang, Beijing (CN); Xiaojie Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 16 days.

(21) Appl. No.: 17/896,941

(22) Filed: Aug. 26, 2022

(65) Prior Publication Data
US 2023/0367375 A1    Nov. 16, 2023

(30) Foreign Application Priority Data
May 13, 2022 (CN) .......................... 202210524591.7

(51) Int. Cl.
*G06F 1/16* (2006.01)
*F16C 11/06* (2006.01)
*F16C 11/12* (2006.01)

(52) U.S. Cl.
CPC ............ *G06F 1/1681* (2013.01); *F16C 11/06* (2013.01); *F16C 11/12* (2013.01)

(58) Field of Classification Search
None
See application file for complete search history.

(56) References Cited

U.S. PATENT DOCUMENTS

| | | | |
|---|---|---|---|
| 2020/0267856 A1* | 8/2020 | Hsu ..................... | H05K 5/0017 |
| 2022/0038564 A1* | 2/2022 | Li ......................... | G06F 1/1652 |
| 2022/0137675 A1* | 5/2022 | Kuramochi ........... | G06F 1/1641 |
| | | | 361/679.27 |
| 2022/0147112 A1 | 5/2022 | Yu et al. | |

(Continued)

FOREIGN PATENT DOCUMENTS

| KR | 20100102490 A | 9/2010 |
|---|---|---|
| KR | 20100125186 A | 11/2010 |
| KR | 20110051326 A | 5/2011 |

(Continued)

OTHER PUBLICATIONS

European Patent Application No. 22192632.2, extended Search and Opinion dated May 31, 2023, 10 pages.

(Continued)

*Primary Examiner* — Anthony Q Edwards
*Assistant Examiner* — Rashen E Morrison
(74) *Attorney, Agent, or Firm* — Cozen O'Connor

(57) ABSTRACT

A linkage device includes a drive component and a support member. The drive component is rotatable during a transmission stroke and an idle stroke. The support member is coupled to the drive component. The drive component and the support member rotate synchronously during the transmission stroke. At least a part of the drive component idles with respect to the support member during the idle stroke. The support member has a retracted position and a support position switched by the transmission stroke. The support member in the retracted position is suitable for storage. The support member in the support position is suitable for stopping and limiting.

19 Claims, 5 Drawing Sheets

(56) References Cited

U.S. PATENT DOCUMENTS

2022/0342456 A1* 10/2022 Shen .................. H05K 5/0221

FOREIGN PATENT DOCUMENTS

| KR | 20130024489 A | 3/2013 |
| KR | 20190128952 A | 11/2019 |

OTHER PUBLICATIONS

Korean Patent Application No. 10-2022-0107368, Office Action dated Jul. 22, 2024, 11 pages.
Korean Patent Application No. 10-2022-0107368, English translation of Office Action dated Jul. 22, 2024, 11 pages.

* cited by examiner

LINKAGE DEVICE, APPARATUS ACCESSORY, AND ELECTRONIC APPARATUS

CROSS-REFERENCE TO RELATED APPLICATION

This application is based on and claims priority to Chinese Patent Application No. 202210524591.7 filed on May 13, 2022, the entire contents of which are incorporated herein by reference.

TECHNICAL FIELD

The present disclosure relates to a field of mechanical linkage technology, and more particularly, to a linkage device, an apparatus accessory, and an electronic apparatus.

BACKGROUND

Electronic apparatuses that can be opened and closed, such as laptops and tablets with keyboards, need hinges to realize their opening and closing. However, in the related art, support from the hinges is not stable, and the tablets and display screens may tip back when opened, causing inconvenience to the user.

SUMMARY

A linkage device according to an embodiment of the present disclosure includes a drive component and a support member. The drive component is rotatable during a transmission stroke and an idle stroke. The support member is coupled to the drive component. The drive component and the support member rotate synchronously during the transmission stroke. At least a part of the drive component idles with respect to the support member during the idle stroke. The support member has a retracted position and a support position that are switched by the transmission stroke. The support member in the retracted position is suitable for storage. The support member in the support position is suitable for stopping and limiting.

An apparatus accessory according to an embodiment of the present disclosure includes a linkage device and a protective casing. The protective casing includes a first portion and a second portion; the first portion is swingable with respect to the second portion, and the first portion is coupled to an overturning member of the linkage device; and the second portion is coupled to a housing of the linkage device. The linkage device includes a drive component and a support member. The drive component is rotatable during a transmission stroke and an idle stroke. The support member is coupled to the drive component. The drive component and the support member rotate synchronously during the transmission stroke. At least a part of the drive component idles with respect to the support member during the idle stroke. The support member has a retracted position and a support position that are switched by the transmission stroke. The support member in the retracted position is suitable for storage. The support member in the support position is suitable for stopping and limiting.

An electronic apparatus according to an embodiment of the present disclosure includes a linkage device; a display screen; and a keyboard rotatably coupled to the display screen by the linkage device. The linkage device includes a drive component and a support member. The drive component is rotatable during a transmission stroke and an idle stroke. The support member is coupled to the drive component. The drive component and the support member rotate synchronously during the transmission stroke. At least a part of the drive component idles with respect to the support member during the idle stroke. The support member has a retracted position and a support position that are switched by the transmission stroke. The support member in the retracted position is suitable for storage. The support member in the support position is suitable for stopping and limiting.

DETAILED DESCRIPTION

Figure 1:
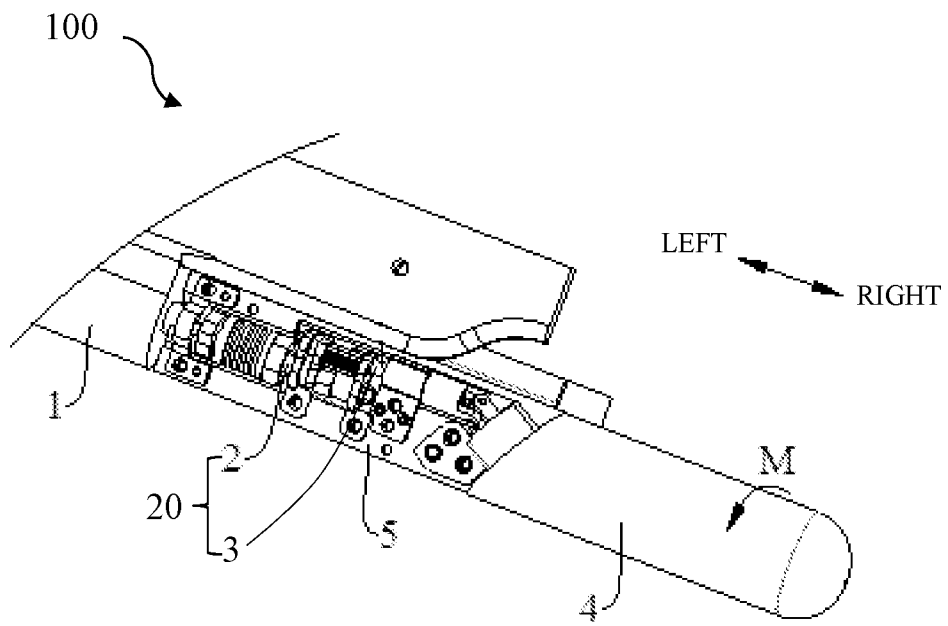
FIG. 1 is a perspective view of a linkage device according to an embodiment of the present disclosure.

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

As shown in FIGS. 1 to 12, a linkage device 100 according to embodiments of the present disclosure includes a drive component 20 and a support member 4.

The drive component 20 has a transmission stroke and an idle stroke. The drive component 20 is rotatable, and during rotation, a rotation stroke of the drive component 20 is divided into the transmission stroke and the idle stroke. It should be noted that the drive component 20 can rotate reciprocally, i.e., the drive component 20 can rotate forward and reversely. During the forward rotation, the rotation stroke of the drive component 20 is divided into the transmission stroke and the idle stroke.

The support member 4 is transmissively coupled to the drive component 20, and the drive component 20 and the support member 4 can rotate synchronously during the rotation of the drive component 20 during the transmission stroke. During the rotation of the drive component 20 during the idle stroke, at least a part of the drive component 20 idles with respect to the support member 4.

For example, the drive component 20 is divided into two component units, namely, a first component unit and a second component unit. The first component unit can rotate alone relative to the support member 4 and the second component unit when the drive component 20 rotates during the idle stroke. The first component unit, the second component unit and the support member 4 can rotate synchronously when the drive component 20 rotates during the transmission stroke.

It may be understood that in some other embodiments, the transmission between the drive component 20 and the support member 4 can be interrupted when the drive component 20 rotates during the idle stroke, in which case the drive component 20 as a whole can rotate relative to the support member 4.

The support member 4 has a retracted position and a support position that are switched by the transmission stroke. That is, when the drive component 20 rotates during the transmission stroke, the support member 4 can rotate along with the drive component 20 and can be switched between the retracted position and the support position. When the support member 4 is switched to the retracted position, the support member 4 is suitable for storage, facilitating the storage of the linkage device 100. When the support member 4 is switched to the support position, the support member 4 is suitable for stopping and limiting, and for example, the support member 4 can stop and limit a display screen of an electronic apparatus, avoiding the overturning of the electronic apparatus.

The linkage device 100 according to the embodiments of the present disclosure has a rotatable connection effect as ordinary hinges, and achieves an effect of linkage between the drive component 20 and the support member 4. That is, the support member 4 can be switched to the support position when a rotation function of the hinge is realized. Consequently, the support member 4 can support some components (such as the display screen and tablets), avoiding tipping back the electronic apparatus and enhancing the support stability.

In some embodiments, the drive component 20 includes a first shaft 2 and a second shaft 3, the second shaft 3 being coupled to the support member 4. During the transmission stroke, the first shaft 2, the second shaft 3 and the support member 4 are transmissively coupled and can rotate synchronously; and during the idle stroke, the first shaft 2 and the second shaft 3 are transmissively separated to allow the first shaft 2 to idle.

As shown in FIG. 1, both the first shaft 2 and the second shaft 3 extend in a left-right direction, and the first shaft 2 and the second shaft 3 are substantially parallel to each other. The first shaft 2 is rotatable in a direction M in FIG. 1, and during the rotation of the first shaft 2, a rotation stroke of the first shaft 2 is divided into two stages, namely, a transmission stroke and an idle stroke. During the transmission stroke, the first shaft 2 and the second shaft 3 are transmissively coupled and can rotate synchronously, in which case the support member 4 also rotates synchronously with the second shaft 3. During the idle stroke, the first shaft 2 and the second shaft 3 are transmissively separated, in which case the first shaft 2 can continue to rotate, while the second shaft 3 and the support member 4 remain stationary.

It should be noted that during forward and reverse rotation of the first shaft 2, the rotation stroke of the first shaft 2 can be divided into the transmission stroke and the idle stroke in each case.

In some embodiments, the linkage device 100 includes an overturning member 1 coupled to the first shaft 2; the overturning member 1 is configured to drive the first shaft 2 to reciprocally rotate; and in the support position, the support member 4 stops and limits the overturning member 1.

As shown in FIG. 1, the overturning member 1 is coupled to a left end of the first shaft 2, and the overturning member 1 cooperates with the first shaft 2 and stops rotation. In use, by rotating the overturning member 1, the first shaft 2 can be driven to rotate forward in the direction M or can be driven to rotate reversely in a direction opposite to the direction M.

In use, the overturning member 1 can be coupled to the display screen of the electronic apparatus, or the overturning member 1 can be integrated with the display screen and considered as a part of the display screen, so that a restraining effect can be achieved by stopping and limiting the overturning member 1 through the support member 4, and the support stability can be ensured.

In some embodiments, in the retracted position, the support member 4 extends in a same direction as the second shaft 3, and in the support position, the support member 4 extends at an angle to the second shaft 3.

As shown in FIG. 1, the support member 4 is coupled to the second shaft 3 and can rotate synchronously with the second shaft 3. The support member 4 is coupled to a right side of the second shaft 3 and the support member 4 has the retracted position and the support position during rotation. As shown in FIG. 1, in the retracted position, the support member 4 extends in the same direction as the second shaft 3, i.e., the support member 4 also switches to a position extending generally along the left-right direction.

Figure 14:
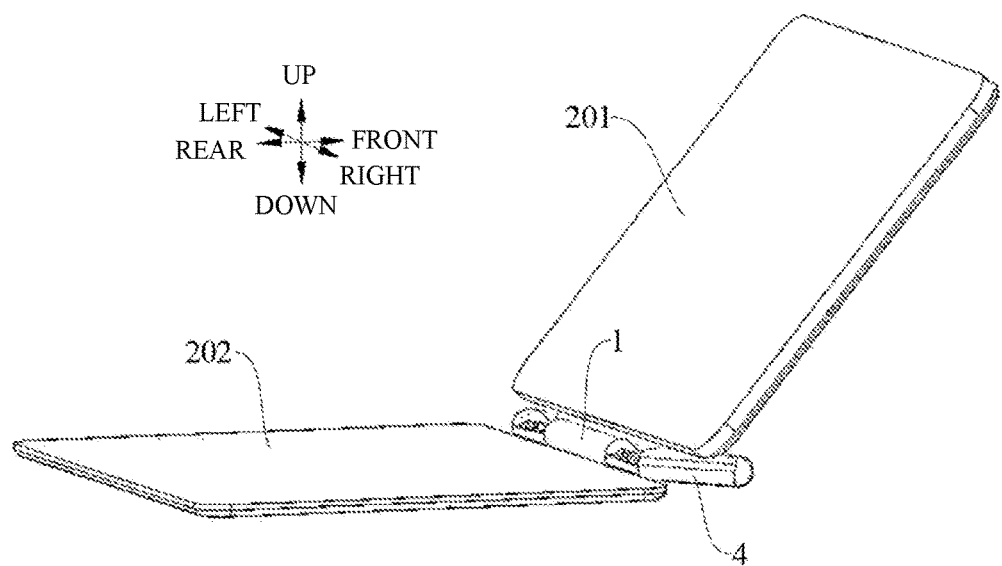
FIG. 14 is a schematic view of an unfolded state of an apparatus accessory according to an embodiment of the present disclosure.

As shown in FIG. 14, in the support position, the support member 4 and the second shaft 3 are at an angle, and the support member 4 is fitted with and stops the overturning member 1. That is, the support member 4 can be supported obliquely on the ground or on the table, and a bottom edge of the overturning member 1 can lap over the support member 4, preventing the overturning member 1 from being suspended after overturning.

With the linkage device 100 according to the embodiments of the present disclosure, during use, the overturning member 1 is coupled to the display screen and other components of the electronic apparatus, so that the overturning member 1 can be supported by the support member 4 after the overturning member 1 has been overturn, enhancing the support stability and avoiding tipping back the electronic apparatus.

During the transmission stroke, the overturning member 1 drives the support member 4 to rotate to the support position through the transmission of the first shaft 2 and the second shaft 3, then the support member 4 remains in the support position, and the overturning member 1 continues to rotate during the idle stroke, which can satisfy a requirement of opening and closing the overturning member 1 at a large angle, enrich the angle adjustment of the overturning member 1 and help to enhance the use convenience.

In some embodiments, the linkage device 100 includes a limiting assembly 6 that acts between the first shaft 2 and the second shaft 3. During the idle stroke, the limiting assembly 6 cooperates with the second shaft 3 to limit the rotation of the second shaft 3. Since the first shaft 2 and the second shaft 3 are transmissively separated during the idle stroke, the second shaft 3 is not restrained by any external force and when the support member 4 is subjected to a force, the second shaft 3 and the support member 4 easily rotate reversely, failing to realize a support effect.

The limiting assembly 6 can restrain the second shaft 3 when the second shaft 3 loses the restraint from the first shaft 2. As a result, a situation where the second shaft 3 rotates at will can be avoided, and the support member 4 can realize the support effect; moreover, the first shaft 2 can rotate independently of the second shaft 3, satisfying the large-angle opening and closing requirement.

In some embodiments, the limiting assembly includes a stopping member 61. During the transmission stroke, the first shaft 2 and the second shaft 3 are rotatable with respect to the stopping member. During the idle stroke, the first shaft 2 is rotatable with respect to the stopping member, and the stopping member cooperates with the second shaft 3 to limit the rotation of the second shaft 3. In other words, the stopping member plays a stopping role only during the idle stroke, and restrains the second shaft 3 and the support member 4 from rotating during the idle stroke of the first shaft 2, which realizes a position-limiting effect.

Figure 8:
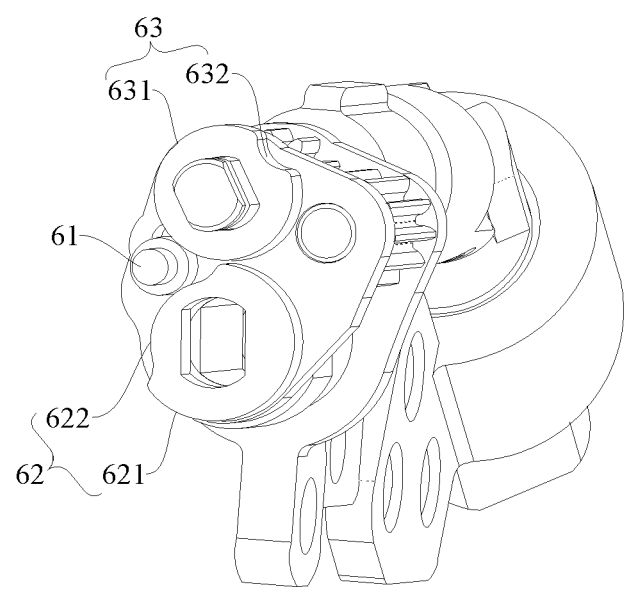
FIG. 8 is a schematic view of the limiting assembly in FIG. 3.

In some embodiments, as shown in FIG. 8, the limiting assembly 6 also includes a first cam 62 and a second cam 63.

The first cam 62 is on the first shaft 2 and is rotatable synchronously with the first shaft 2. An outer peripheral wall of the first cam 62 includes a first peripheral wall 621 and a guide slot 622. The first cam 62 is fitted in an outer peripheral side of the first shaft 2 in a rotation-resistant manner. The first cam 62 can rotate synchronously with the first shaft 2. The first cam 62 is substantially circular. As shown in FIG. 8, the outer peripheral wall of the first cam 62 includes two portions, namely, the first peripheral wall 621 and the guide slot 622, in which a radial dimension of the first cam 62 at the first peripheral wall 621 is larger than a radial dimension of the first cam 62 at the guide slot 622.

The second cam 63 is fitted with the second shaft 3 and is rotatable synchronously with the second shaft 3. An outer peripheral wall of the second cam 63 includes a second peripheral wall 631 and a snap slot 632. As shown in FIG. 8, the second cam 63 is fitted in an outer peripheral side of the second shaft 3 in a rotation-resistant manner. The second cam 63 can rotate synchronously with the first shaft 2. The second cam 63 is substantially circular. The outer peripheral wall of the second cam 63 includes two portions, namely, the second peripheral wall 631 and the snap slot 632, in which a radial dimension of the second cam 63 at the second peripheral wall 631 is larger than a radial dimension of the second cam 63 at the snap slot 632.

During the transmission stroke, the stopping member 61 is fitted between the guide slot 622 and the second peripheral wall 631 and the stopping member 61 slides along the guide slot 622. As shown in FIG. 8, the stopping member 61 is stationary while the first shaft 2 rotates during the transmission stroke. As the second shaft 3 rotates, the second peripheral wall 631 of the second cam 63 is tangential to the stopping member 61 and rotates relative to the stopping member 61. Meanwhile, a part of the stopping member 61 is fitted in the guide slot 622. As the first shaft 2 rotates, the peripheral movement of the guide slot 622 causes relative movement of the stopping member 61 in the guide slot 622.

During the idle stroke, the stopping member 61 is fitted between the snap slot 632 and the first peripheral wall 621. As shown in FIG. 8, when the first shaft 2 rotates during the idle stroke and the snap slot 632 on the second cam 63 has been rotated to the stopping member 61, the second cam 63 can be held in position under a stopping action of the stopping member 61, and the rotation of the second shaft 3 can be limited. Meanwhile, the stopping member 61 slides out of the guide slot 622, and the first peripheral wall 621 of the first cam 62 is tangential to the stopping member 61 and is rotatable peripherally relative to the stopping member 61. Thus, the stopping member 61 can be limited in the snap slot 632 and the first shaft 2 can continue to rotate during the idle stroke.

In some embodiments, the stopping member 61 is slidable between the first cam 62 and the second cam 63. The stopping member 61 slides into the guide slot by a push of the second peripheral wall 631 when the idle stroke is switched to the transmission stroke. The stopping member 61 slides into the snap slot 632 by a push of the first peripheral wall 621 when the transmission stroke is switched to the idle stroke.

Figure 3:
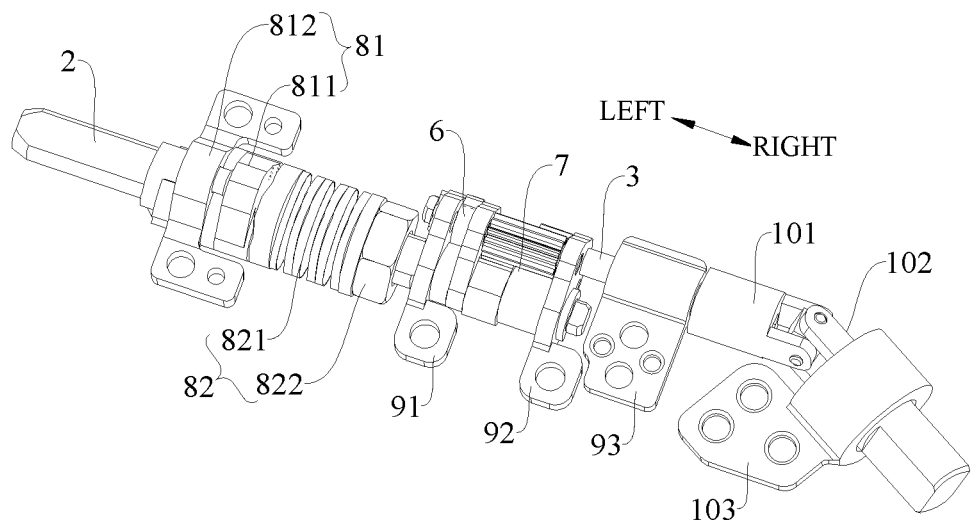
FIG. 3 is a schematic view of a drive component of the linkage device in FIG. 2.
Figure 7:
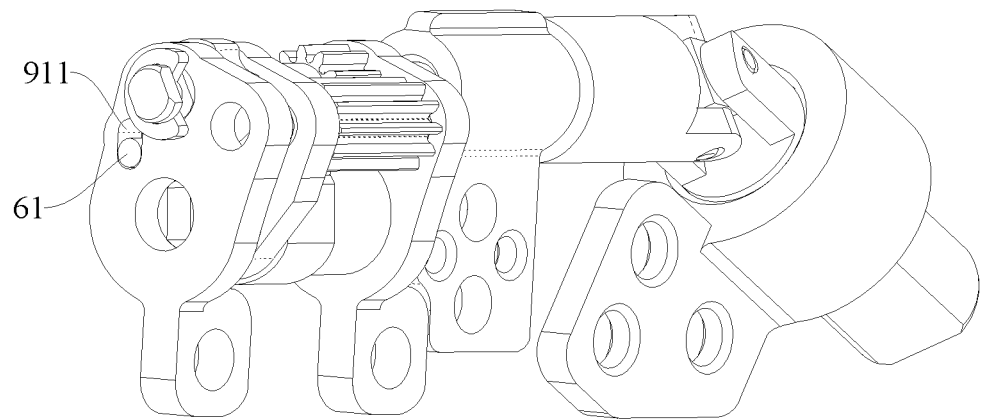
FIG. 7 is a schematic view of a stopping member of a limiting assembly in FIG. 3.

As shown in FIG. 3, the limiting assembly 6 is sandwiched between two fixing members 9. The fixing members 9 are in the form of plates, and the fixing members 9 are configured to hold the linkage device 100 in place. Both the first shaft 2 and the second shaft 3 pass through the two fixing members 9, and rotate and fit with the two fixing members 9. As shown in FIG. 7, each fixing member 9 has a sliding slot 911, and two sliding slots 911 of the two fixing members 9 extend in a common direction, both ends of the stopping member 61 being sliding and fitted in the corresponding sliding slots 911.

The stopping member 61 is slidable in an extension direction of the two sliding slots 911. Thus, during the transition of the first shaft 2 from the idle stroke to the transmission stroke, the second peripheral wall 631 of the second cam 63 can be pushed against the stopping member 61 and push the stopping member 61 into the guide slot 622. During the transition of the first shaft 2 from the transmission stroke to the idle stroke, the first peripheral wall 621 of the first cam 62 can be pushed against the stopping member 61 and push the stopping member 61 into the snap slot 632. The sliding of the stopping member 61 satisfies a requirement for limiting the position of the second cam 63 and a requirement for the transmission of the first shaft 2 and the second shaft 3.

In some embodiments, the stopping member 61 is rotatable; the stopping member 61 rolls and is fitted between the guide slot 622 and the second peripheral wall 631 during the transmission stroke and between the snap slot 632 and the first peripheral wall 621 during the idle stroke. As shown in FIG. 8, the stopping member 61 is substantially cylindrical in shape, so that the stopping member 61 can rotate by itself when the first shaft 2 rotates, reducing friction between the stopping member 61, and the first shaft 2 and the second peripheral wall 631 and allowing for a smoother rotational drive of the first shaft 2.

In some embodiments, as shown in FIG. 3, the linkage device 100 includes a transmission assembly 7 that acts between the first shaft 2 and the second shaft 3. During the transmission stroke, the first shaft 2 is transmissively coupled to the second shaft 3 through the transmission assembly 7, and the first shaft 2 and the second shaft 3 rotate in a common direction. During the idle stroke, the transmission assembly 7 is transmissively separated to allow the first shaft 2 to idle. The requirement for transmission between the first shaft 2 and the second shaft 3 can be satisfied. The common rotation direction of the first shaft 2 and the second shaft 3 allows the overturning member 1 and the support member 4 to rotate in a common direction to satisfy a practical use requirement.

In some embodiments, the transmission assembly 7 includes an incomplete gear 71, a first gear 72 and a second gear 73. The incomplete gear 71 is on the first shaft 2; the first gear 72 is on the second shaft 3; and the second gear 73 transmissively meshes between the incomplete gear 71 and the first gear 72. The incomplete gear 71 meshes with the second gear 73 during the transmission stroke, and the incomplete gear 71 is disengaged from the second gear 73 during the idle stroke.

Figure 9:
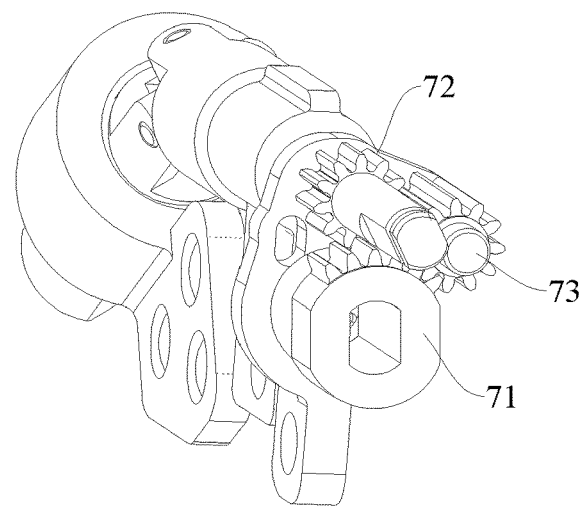
FIG. 9 is a first schematic view of a transmission assembly in FIG. 3.

As shown in FIG. 9, the transmission assembly 7 is sandwiched between two fixing members 9. The incomplete gear 71 is fitted at an outer peripheral side of the first shaft 2 in a rotation-resistant manner. The first gear 72 is fitted at an outer peripheral side of the second shaft 3 in a rotation-resistant manner. The second gear 73 is rotatably assembled between the two fixing members 9, a first side of the second gear 73 meshing with the first gear 72 and a second side of the second gear 73 meshing with the incomplete gear 71.

During the rotation of the incomplete gear 71, the incomplete gear 71 can engage with or disengage from the second gear 73, satisfying transmission and non-transmission requirements for the first shaft 2.

Figure 10:
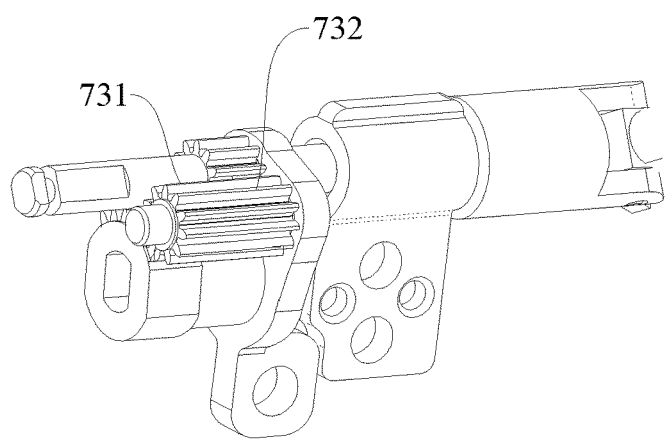
FIG. 10 is a second schematic view of the transmission assembly in FIG. 3.

In some embodiments, the second gear 73 includes a first segment 731 and a second segment 732 in an axial direction; the incomplete gear 71 transmissively meshes with the first segment 731; and the first gear 72 transmissively meshes with the second segment 732. As shown in FIG. 10, the second gear 73 has a certain extension length in the axial direction (the left-right direction); the first segment 731 is a left half of the second gear 73 and the second segment 732 is the right half of the second gear 73; the incomplete gear 71 is on a left side of the first gear 72 and meshes with the first segment 731; and the second gear 73 meshes with the second segment 732. As a result, the incomplete gear 71 and the first gear 72 are at staggered positions in space, which avoids mutual interference between the incomplete gear 71 and the first gear 72, improves the space utilization rate, and facilitates the miniaturization of the linkage device 100.

In some embodiments, the linkage device 100 includes a damping assembly 8; the damping assembly 8 includes a fixed portion 81 and a movable portion 82; the movable portion 82 is on the first shaft 2 and is rotatable along with the first shaft 2; and the fixed portion 81 and the movable portion 82 are fitted together to form a damper, so that the first shaft 2 can be held in position after the first shaft 2 is rotated.

Figure 2:
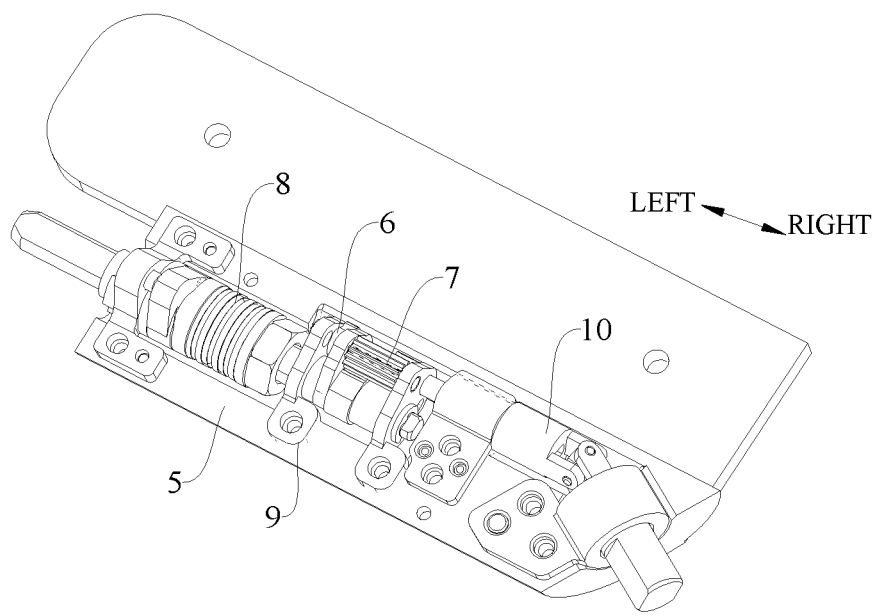
FIG. 2 is a partially enlarged view of the linkage device in FIG. 1.

As shown in FIGS. 2 and 3, both the fixed portion 81 and the movable portion 82 are fitted over the first shaft 2, in which the fixed portion 81 is rotatable along with the first shaft 2 and the movable portion 82 is fitted with the first shaft 2 in a rotation-resistant manner. The fixed portion 81 is on a left side of the movable portion 82. When the first shaft 2 rotates, the fixed portion 81 remains stationary and the movable portion 82 is rotatable along with the first shaft 2. With a damping effect formed between the fixed portion 81 and the movable portion 82, the first shaft 2 can rotate at any angle and remain in position after rotation, enabling the overturning member to hover at any position and allowing the user to switch to any angle as required, which is convenient for use.

In some embodiments, the fixed portion 81 includes a first protrusion 8111 on its end face abutting against the movable portion 82, and the movable portion 82 includes a second protrusion 8211 on its end face abutting against the fixed portion 81. During the transmission stroke, the first protrusion 8111 is stopped by the second protrusion 8211. During the idle stroke, the first protrusion 8111 crosses over the second protrusion 8211, and the movable portion 82 is elastically retractable to allow the first protrusion 8111 to get over the second protrusion 8211.

Figure 5:
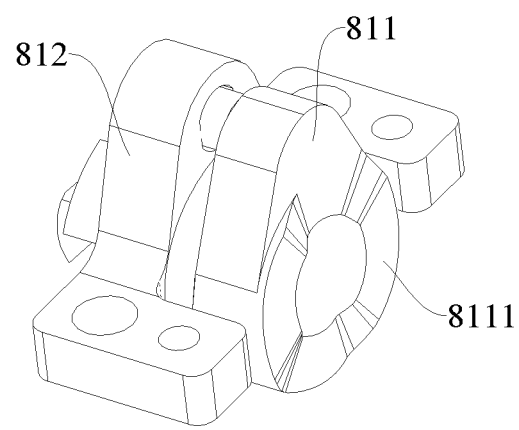
FIG. 5 is a schematic view of a fixed portion of a damping assembly in FIG. 3.
Figure 6:
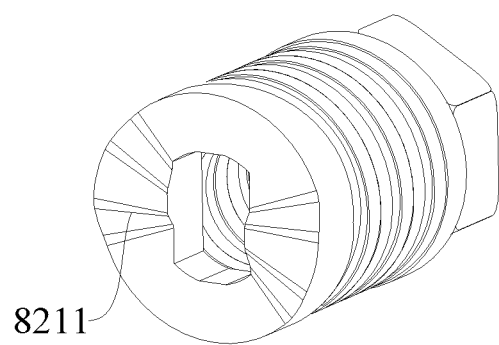
FIG. 6 is a schematic view of a movable portion of the damping assembly in FIG. 3.

As shown in FIG. 5, the first protrusion 8111 is at a right end of the fixed portion 81; there are a plurality of first protrusions 8111, and the plurality of first protrusions 8111 are spaced apart along a peripheral direction of the fixed portion 81. As shown in FIG. 6, the second protrusion 8211 is at a left end of the movable portion 82, and there is a plurality of second protrusions 8211, and the plurality of second protrusions 8211 are spaced along a peripheral direction of the movable portion 82.

In use, the plurality of first protrusions 8111 and the plurality of second protrusions 8211 are arranged circumferentially in an alternating manner. Consequently, the damping effect of the fixed portion 81 and the movable portion 82 can be enhanced, and when the first shaft 2 is rotated to a set angle, the first protrusions 8111 can cross over the approaching second protrusions 8211, giving the user a sense of feedback and upgrading the operating experience.

In some embodiments, the first protrusion 8111 and the second protrusion 8211 are guide slopes, allowing the first protrusion 8111 and the second protrusion 8211 to cross over each other conveniently.

It should be noted that the movable portion 82 is elastically retractable, so that the first protrusion 8111 and the second protrusion 8211 can cross over each other by the retraction of the movable portion 82, and the movable portion 82 keeps abutting against the fixed portion 81 by the extension of the movable portion 82 to provide a damping effect.

In some embodiments, the movable portion 82 includes an elastic member 821 and an adjusting member 822; the elastic member 821 is fitted over the first shaft 2 and is fitted with the first shaft 2 in a rotation-resistant manner; the elastic member 821 is sandwiched between the adjusting member 822 and the fixed portion 81; the adjusting member 822 is on the first shaft 2 with its position being adjustable; the adjusting member 822 is configured to stop an end of the elastic member 821 and adjust an elastic force of the elastic member 821.

As shown in FIG. 3, the elastic member 821 is a disc spring, and the elastic member 821 is fitted over the first shaft 2 and fitted with the first shaft 2 in a rotation-resistant manner; the adjusting member 822 is a nut and threadedly fitted on the first shaft 2. During use, the adjusting member 822 stops a right end of the elastic member 821, generating a position-limiting effect; and a left end of the elastic member 821 keeps abutting against the fixed portion 81, generating a damping effect. When the elastic force of the elastic member 821 needs to be adjusted, the adjusting member 822 can be rotated, and the user can adjust the damping effect according to practical situations.

Figure 4:
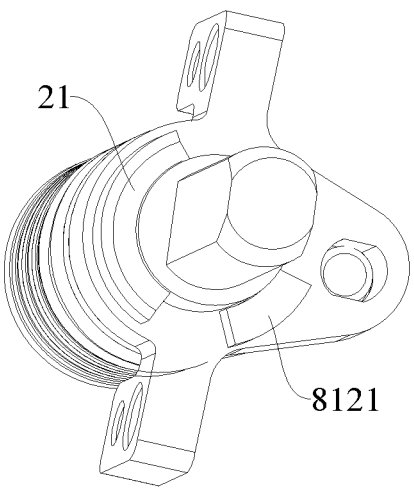
FIG. 4 is a schematic view of a left end of a first shaft in FIG. 3.

In some embodiments, the fixed portion 81 includes a first stopping portion 8121, and the first shaft 2 includes a second stopping portion 21. The first stopping portion 8121 is fitted with and stopped by the second stopping portion 21, to limit the rotation stroke of the first shaft 2. As shown in FIG. 4, the first stopping portion 8121 is fan-shaped and integrated with the fixed portion 81, and the second stopping portion 21 is also fan-shaped and integrated with the first shaft 2. In use, the first stopping portion 8121 can be stopped by the second stopping portion 21 to limit a maximum rotation stroke of the first shaft 2.

In some embodiments, the linkage device 100 includes a housing 5. The housing 5 has a first abutting surface 51, and the support member 4 has a second abutting surface 41. The first abutting surface 51 abuts against the second abutting surface 41 in both the retracted position and the support position.

Figure 11:
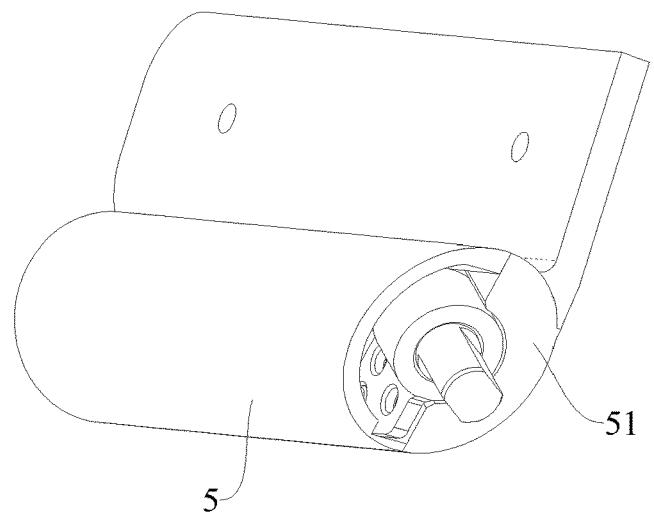
FIG. 11 is a schematic view of a first abutting surface on a housing in FIG. 3.
Figure 12:
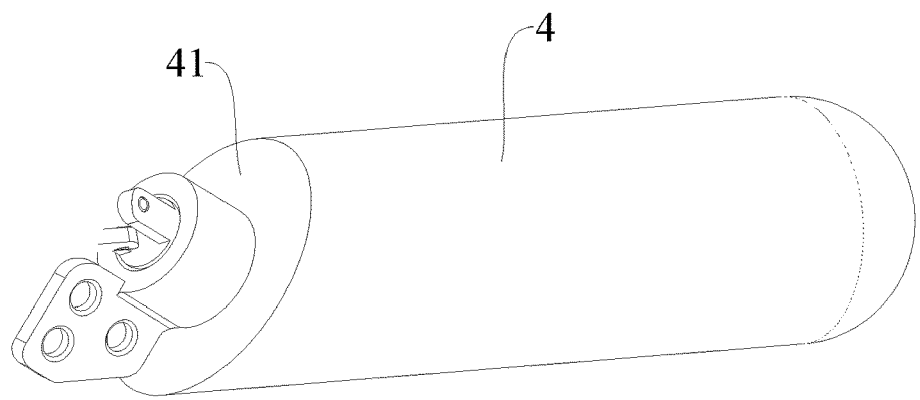
FIG. 12 is a schematic view of a second abutting surface on a support member in FIG. 3.

As shown in FIG. 11, the housing 5 is cylindrical and the first abutting surface 51 is elliptical. As shown in FIG. 12, the support member 4 is also substantially cylindrical and the second abutting surface 41 is also elliptical. The support member 4 is rotatable by 180 degrees along with the second shaft 3. Thus, in the retracted position, the first abutting surface 51 abuts against the second abutting surface 41, and the housing 5 and the support member 4 are assembled into a cylindrical body as a whole, enhancing integration and aesthetics and facilitating storage. In the support position, the second abutting surface 41 is rotated by 180 degrees and abuts against the first abutting surface 51, in which case the housing 5 and the support member 4 are at an angle to meet the need for support and use.

In some embodiments, as shown in FIG. 3, the second shaft 3 is coupled to the support member 4 by a universal joint 10. The universal joint 10 includes a first joint 101 and a second joint 102, the first joint 101 being coupled to the second shaft 3 and the second joint 102 being coupled to the support member 4. An axial direction of the first joint 101 is at a first angle to an axial direction of the second joint 102, in which the first angle is an obtuse angle.

The second joint 102 is rotatably assembled with the housing 5, and both the first abutting surface 51 and the second abutting surface 41 are at a second angle to the axial direction of the second joint 102, in which the second angel is a right angle. That is, both the first abutting surface 51 and the second abutting surface 41 are perpendicular to the axial direction of the second joint 102. Thus, a requirement for different transmission axes and a requirement for transmission between the second shaft 3 and the support member 4 can be satisfied.

In some embodiments, the linkage device 100 includes a plurality of fixing members 9. The first shaft 2 is rotatably fitted with at least part of the fixing members 9, and the second shaft 3 is rotatably fitted with at least part of the fixing members 9. The first shaft 2 and the second shaft 3 are assembled in the housing 5 by the plurality of fixing members 9.

As shown in FIGS. 2 and 3, there are four fixing members, including a first member 91, a second member 92, a third member 93 and a fourth member 103. The first member 91 and the second member 92 are assembled in a part where the first shaft 2 and the second shaft 3 overlap in the left-right direction. The first member 91 is on a left side of the second member 92 and is spaced apart from the second member 92. Both the first shaft 2 and the second shaft 3 are rotatably fitted with the first member 91 and the second member 92. The limiting assembly 6 and the transmission assembly 7 are between the first member 91 and the second member 92 and are separated by a partition plate that may also be regarded as one fixing member 9.

As shown in FIG. 3, each of the third member 93 and the fourth member 103 includes a sleeve; the third member 93 is on a right side of the second member 92; the second shaft 3 is rotatably assembled within the sleeve of the third member 93; the fourth member 103 is on a right side of the third member 93; and the second joint 102 is rotatably assembled within the sleeve of the fourth member 103.

The first member 91, the second member 92, the third member 93, and the fourth member 103 are all coupled to the housing 5, enabling the mounting and fixing of the linkage device 100 to the housing 5.

In some embodiments, as shown in FIG. 5, the fixed portion 81 has a split structure, and the fixed portion 81 includes a first seat 811 and a second seat 812. The first seat 811 is on a right side of the second seat 812, and the second seat 812 is fixedly coupled to the housing 5. The first seat 811 is rotatably coupled to the second seat 812 via a pin, such that the first seat 811 has a certain degree of freedom and its adaptability to the movable portion 82 is enhanced.

In some embodiments, a central angle corresponding to the guide slot 622 is 90°, and a total rotation angle of the first shaft 2 is 130°. The stopping member 61 moves along the guide slot 622 as the first shaft 2 rotates during the transmission stroke, in which case the first shaft 2 rotates by 90° and the support member 4 rotates by 180° under a transmission effect of the second shaft 3. The first shaft 2 transitions to the idle stroke and continues to rotate to 130°, in which case the first stopping portion 8121 and the second stopping portion 21 are stopped by each other for position limiting.

An apparatus accessory according to embodiments of the present disclosure will be described below.

Figure 13:
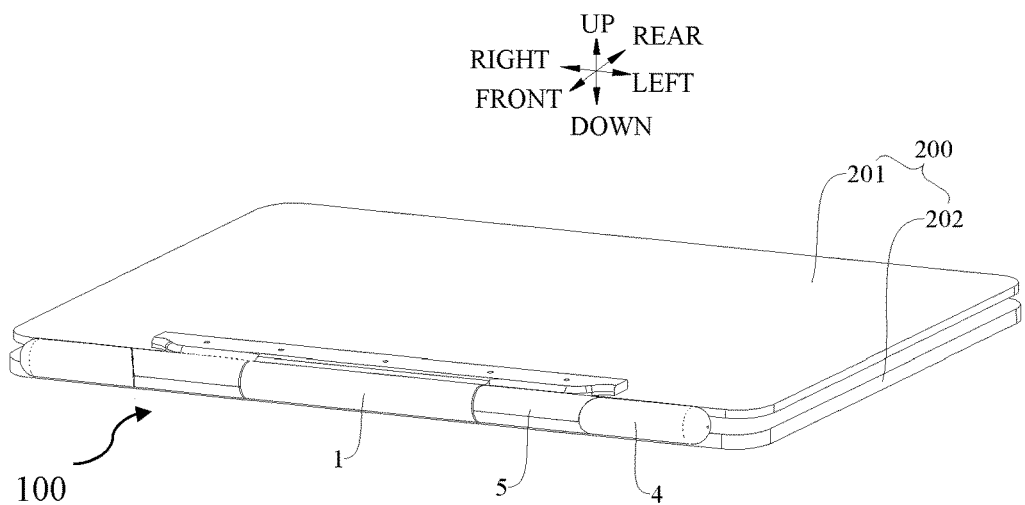
FIG. 13 is a schematic view of an overlapping state of an apparatus accessory according to an embodiment of the present disclosure.

The apparatus accessory according to embodiments of the present disclosure includes a linkage device 100, which may be the linkage device 100 described in the above embodiments. As shown in FIGS. 13 and 14, the apparatus accessory includes a protective casing 200, and the protective casing 200 includes a first portion 201 and a second portion 202. The first portion 201 is swingable with respect to the second portion 202, and the first portion 201 is coupled to the overturning member 1, in which case the overturning member 1 may be regarded as a part of the first portion 201. The second portion 202 is coupled to the housing 5, which may also be regarded as a part of the second portion 202.

In use, the first portion 201 can be overturn from back to front, and the first portion 201 drives the overturning member 1, and in turn drives the first shaft 2, the second shaft 3 and the support member 4 to rotate synchronously. When the first portion 201 is overturn to a position as shown in FIG. 14, the support member 4 is propped up between a tabletop and a lower edge of the first portion 201, providing a support effect for the first portion 201.

When the apparatus accessory needs to be stored, the first portion 201 can be overturn backwards, and during the idle stroke, only the first portion 201, the overturning member 1 and the first shaft 2 rotate backwards. After the transition to the transmission stroke, the second shaft 3 and the support member 4 can rotate backwards along with the first portion 201 until the first portion 201 from the above overlaps the second portion 202, in which case the support member 4 is switched to a storage position, as shown in FIG. 13.

It is to be noted that the first portion 201 and the second portion 202 are two separate portions, and the first portion 201 and the second portion 202 are flexibly coupled to meet a requirement for relative rotation of the first portion 201 and the second portion 202.

In some embodiments, as shown in FIGS. 13 and 14, there are two linkage devices 100, and the two linkage devices 100 share one overturning member 1, in which case the overturning member 1 is between the two linkage devices 100, improving symmetry, in turn enhancing the support stability.

An electronic apparatus according to embodiments of the present disclosure will be described below.

The electronic apparatus according to embodiments of the present disclosure includes only the linkage device 100 described in the above embodiments. For example, the electronic apparatus is a notebook that includes a display screen and a keyboard, the display screen and the keyboard being rotatably coupled to each other using the linkage device 100.

In some other embodiments, the electronic apparatus may include the apparatus accessory described in the above embodiments. For example, the electronic apparatus includes a tablet and a split keyboard, the tablet being fixed to the first portion 201 of the apparatus accessory and the split keyboard being fixed to the second portion 202 of the apparatus accessory.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "coupled," "connected," "fixed" and the like are used broadly, and may be, for example, fixed connections, detachable connections, or integral connections; may also be mechanical or electrical connections or intercommunication; may also be direct connections or indirect connections via intermediate media; may also be inner communications or interactions of two elements. For those skilled in the art, the specific meaning of the above terms in the present disclosure can be understood according to the specific circumstances.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an intermediate medium formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the above embodiments have been shown and described, it can be understood that the above embodiments are exemplary and shall not be understood as limitation to the present disclosure, and changes, modifications, alternatives, and variations can be made in the above embodiments within the scope of the present disclosure.

What is claimed is:

1. A linkage device, comprising:
    a drive component rotatable during a transmission stroke and an idle stroke; and
    a support member coupled to the drive component,
    wherein:
    the drive component and the support member rotate synchronously during the transmission stroke, and at least a part of the drive component idles with respect to the support member during the idle stroke; and
    the support member has (i) a retracted position in which the support member is suitable for storage and (ii) a support position in which the support member is suitable for stopping and limiting, wherein the retracted position and the support position are switched by the transmission stroke,
    wherein the drive component comprises a first shaft and a second shaft, the second shaft being coupled to the support member;
    during the transmission stroke, the first shaft, the second shaft and the support member are transmissively coupled and rotate synchronously; and
    during the idle stroke, the first shaft and the second shaft are transmissively separated and the first shaft idles.

2. The linkage device according to claim 1, further comprising an overturning member coupled to the first shaft, wherein the overturning member is configured to drive the first shaft to reciprocally rotate, and in the support position, the support member stops and limits the overturning member.

3. The linkage device according to claim 1, wherein the support member extends in a same direction as the second shaft in the retracted position, and the support member extends at an angle to the second shaft in the support position.

4. The linkage device according to claim 1, comprising a limiting assembly,
    wherein:
    the limiting assembly acts between the first shaft and the second shaft; and
    during the idle stroke, the limiting assembly cooperates with the second shaft to limit rotation of the second shaft.

5. The linkage device according to claim 4, wherein:
    the limiting assembly comprises a stopping member;
    during the transmission stroke, the first shaft and the second shaft are rotatable with respect to the stopping member; and
    during the idle stroke, the first shaft is rotatable with respect to the stopping member, and the stopping member cooperates with the second shaft to limit the rotation of the second shaft.

6. The linkage device according to claim 5, wherein the limiting assembly comprises:
  a first cam on the first shaft and being rotatable synchronously with the first shaft, an outer peripheral wall of the first cam comprising a first peripheral wall and a guide slot; and
  a second cam on the second shaft and being rotatable synchronously with the second shaft, an outer peripheral wall of the second cam comprising a second peripheral wall and a snap slot;
  wherein:
  during the transmission stroke, the stopping member is fitted between the guide slot and the second peripheral wall and slides along the guide slot; and
  during the idle stroke, the stopping member is fitted between the snap slot and the first peripheral wall.

7. The linkage device according to claim 6, wherein:
  the stopping member is slidable between the first cam and the second cam;
  the stopping member slides into the guide slot by a push of the second peripheral wall during a switch from the idle stroke to the transmission stroke; and
  the stopping member slides into the snap slot by a push of the first peripheral wall during a switch from the transmission stroke to the idle stroke.

8. The linkage device according to claim 6, wherein:
  the stopping member is rotatable;
  the stopping member rolls and is fitted between the guide slot and the second peripheral wall during the transmission stroke; and
  the stopping member rolls and is fitted between the snap slot and the first peripheral wall during the idle stroke.

9. The linkage device according to claim 1, comprising a transmission assembly acting between the first shaft and the second shaft,
  wherein:
  during the transmission stroke, the first shaft is transmissively coupled to the second shaft through the transmission assembly, and the first shaft and the second shaft rotate in a common direction; and
  during the idle stroke, the transmission assembly is transmissively separated to allow the first shaft to idle.

10. The linkage device according to claim 9, wherein the transmission assembly comprises:
  an incomplete gear on the first shaft;
  a first gear on the second shaft; and
  a second gear transmissively meshing between the incomplete gear and the first gear,
  wherein the incomplete gear transmissively meshes with the second gear with during the transmission stroke and is disengaged from the second gear during the idle stroke.

11. The linkage device according to claim 10, wherein the second gear comprises a first segment and a second segment in an axial direction; the incomplete gear transmissively meshes with the first segment; and the first gear transmissively meshes with the second segment.

12. The linkage device according to claim 1, comprising a damping assembly,
  wherein:
  the damping assembly comprises a fixed portion and a movable portion;
  the movable portion is on the first shaft and is rotatable along with the first shaft; and
  the fixed portion and the movable portion are fitted together to form a damper, and the first shaft is held in position after rotation.

13. The linkage device according to claim 12, wherein:
  the fixed portion comprises a first protrusion on an end face abutting against the movable portion, and the movable portion comprises a second protrusion on an end face abutting against the fixed portion;
  during the transmission stroke, the first protrusion is stopped by the second protrusion; and
  during the idle stroke, the first protrusion crosses over the second protrusion, and the movable portion is elastically retractable to allow the first protrusion to get over the second protrusion.

14. The linkage device according to claim 13, wherein the movable portion comprises:
  an elastic member fitted over the first shaft and fitted with the first shaft in a rotation-resistant manner; and
  an adjusting member on the first shaft with a position of the adjusting member being adjustable,
  wherein the elastic member is sandwiched between the adjusting member and the fixed portion, and the adjusting member is configured to stop an end of the elastic member and adjust an elastic force of the elastic member.

15. The linkage device according to claim 12, wherein the fixed portion comprises a first stopping portion, and the first shaft comprises a second stopping portion, the first stopping portion being fitted with and stopped by the second stopping portion to limit a rotation stroke of the first shaft.

16. The linkage device according to claim 1, comprising a housing,
  wherein the housing has a first abutting surface, the support member has a second abutting surface, and the first abutting surface abuts against the second abutting surface in both the retracted position and the support position.

17. The linkage device according to claim 16, wherein:
  the second shaft is coupled to the support member by a universal joint;
  the universal joint comprises a first joint and a second joint, the first joint being coupled to the second shaft and the second joint being coupled to the support member;
  an axial direction of the first joint is at a first angle to an axial direction of the second joint;
  the second joint is rotatably assembled with the housing; and
  the first abutting surface and the second abutting surface are at a second angle to the axial direction of the second joint.

18. An apparatus accessory, comprising:
  a linkage device; and
  a protective casing,
  wherein:
  the protective casing comprises a first portion and a second portion;
  the first portion is swingable with respect to the second portion, and the first portion is coupled to an overturning member of the linkage device;
  the second portion is coupled to a housing of the linkage device;
  the linkage device further comprises: a drive component rotatable during a transmission stroke and an idle stroke; and a support member coupled to the drive component;
  the drive component and the support member rotate synchronously during the transmission stroke, and at least a part of the drive component idles with respect to the support member during the idle stroke; and the support member has a retracted position in which the support member is suitable for storage and a support position in which the support member is suitable for stopping and limiting, and the retracted position and the support position are switched by the transmission stroke, wherein the drive component comprises a first shaft and a second shaft, the second shaft being coupled to the support member;

during the transmission stroke, the first shaft, the second shaft and the support member are transmissively coupled and rotate synchronously; and during the idle stroke, the first shaft and the second shaft are transmissively separated and the first shaft idles.

19. An electronic apparatus, comprising:
a linkage device; and
a display screen coupled to the linkage device,
wherein:
the linkage device comprises: a drive component rotatable during a transmission stroke and an idle stroke; and a support member coupled to the drive component;

the drive component and the support member rotate synchronously during the transmission stroke, and at least a part of the drive component idles with respect to the support member during the idle stroke; and the support member has a retracted position in which the support member is suitable for storage and a support position in which the support member is suitable for stopping and limiting, and the retracted position and the support position are switched by the transmission stroke, wherein the drive component comprises a first shaft and a second shaft, the second shaft being coupled to the support member;

during the transmission stroke, the first shaft, the second shaft and the support member are transmissively coupled and rotate synchronously; and during the idle stroke, the first shaft and the second shaft are transmissively separated and the first shaft idles.

\* \* \* \* \*